United States Patent [19]
Kilmarx

[11] 3,742,998
[45] July 3, 1973

[54] PROCESS FOR PREPARING TUBELESS PNEUMATIC TIRES FOR USE STRUCTURE BY WHICH THE PROCESS MAY BE UTILIZED

[75] Inventor: Louis Edward Kilmarx, Dirkson, Tenn.

[73] Assignee: Scovill Manufacturing Company, Waterbury, Conn.

[22] Filed: May 20, 1971

[21] Appl. No.: 145,519

Related U.S. Application Data

[62] Division of Ser. No. 886,592, Dec. 10, 1969, Pat. No. 3,610,312, which is a division of Ser. No. 669,225, Sept. 20, 1967.

[52] U.S. Cl. .............................................. 152/427
[51] Int. Cl. ........................................... B60c 29/00
[58] Field of Search.................... 152/342, 381, 427; 301/5 R, 5 BH, 10

[56] References Cited
UNITED STATES PATENTS
2,871,907  2/1959  Loofbourrow ..................... 152/427
3,157,219  11/1964  Dimin et al. ........................ 301/5 R Primary Examiner—Drayton E. Hoffman
Attorney—Dallett Hoopes

[57] ABSTRACT

The tubeless tire is mounted on a rim in which the valve-stem opening is blocked by obstruction means having any of various structures. The tire is filled "under the bead." Subsequently a selected valve stem is used to force the obstruction means to unblock the opening and is mounted in the opening in communication with the tire.

2 Claims, 26 Drawing Figures

PATENTED JUL 3 1973 3,742,998
SHEET 1 OF 2
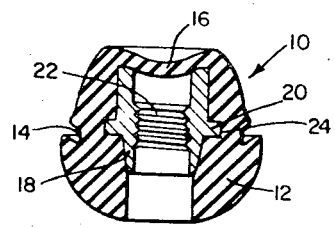
Fig. 1
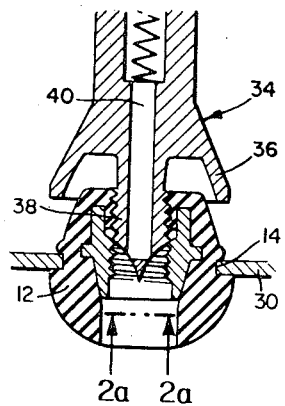
Fig. 2
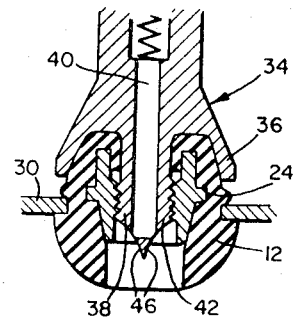
Fig. 3
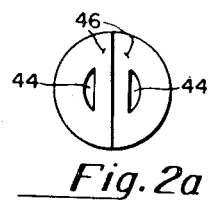
Fig. 2a
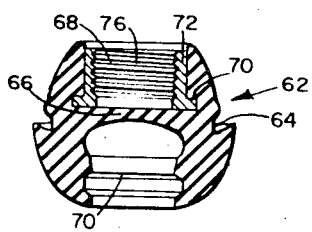
Fig. 4
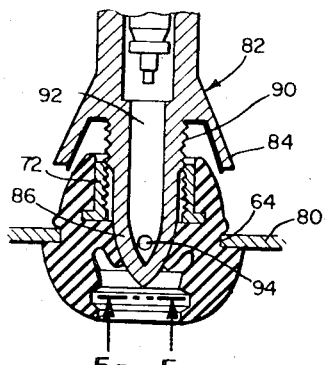
Fig. 5
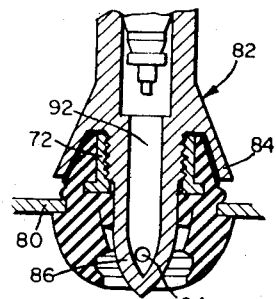
Fig. 6
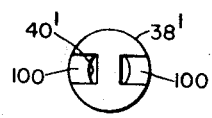
Fig. 5a
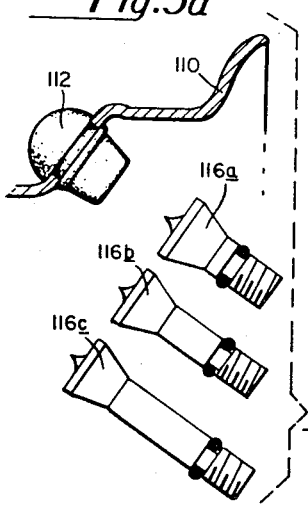
Fig. 7
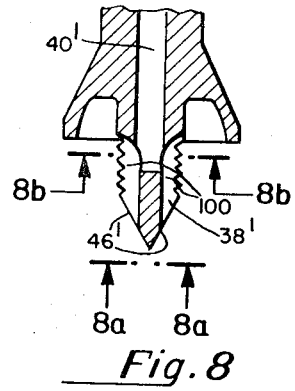
Fig. 8
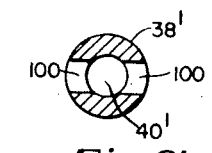
Fig. 8a
Fig. 8b 3,742,998

PROCESS FOR PREPARING TUBELESS PNEUMATIC TIRES FOR USE STRUCTURE BY WHICH THE PROCESS MAY BE UTILIZED

This is a division of application Ser. No. 886,592, filed Dec. 10, 1969, now U.S. Pat. No. 3,610,312 which is a divisional of application Ser. No. 669,225, filed Sept. 20, 1967.

This invention relates to a process for preparing tubeless pneumatic tires for use and to means by which the process may be utilized.

In the past, it has been customary at the automobile factory for the tubeless tire supplier to supply a so-called "snap-in" valve assembly, including a "snap-in" valve stem and core, which in the assembly of the tire on the rim is mounted in the rim valve stem opening. The snap-in valve has actually not been used to fill the tire at the factory. Instead, the rim, mounted with the tire and valve, has been placed in a tire-filling chamber and the tire has been filled under the bead.

"Filling under the bead" is accomplished by pressurizing the chamber and pressing one of the side beads of the tire away from its rim flange and toward the opposite bead. Air in the chamber passes under the bead and fills the tire. The bead is then released and the fill chamber is de-pressurized. The air pressure in the tire, now higher than the pressure on the outside of the tire, forces the bead out into tight engagement with its rim flange, assuring a seal.

Even though the valve has not been used to fill the tire in the factory, the manufacturer has traditionally borne the expense of supplying the valve and has mounted it on the wheel in the factory. The traditional procedure has been objectionable to the purchaser as well, for it has meant that he has had no selection in the type of valve with which his car is originally equipped: he has been forced to accept the type of stem which the manufacturer has provided. In many cases, this has meant that after purchase of the car, he has had to purchase from an after-market supplier the valve stems which he wanted in the first place and has had to install them, discarding those supplied.

The present invention relates to a process wherein the tubeless tire is mounted on the rim, the rim being provided with a valve-stem-receiving opening. Under the invention, the opening is blocked by obstruction means secured to the rim and the tire is filled under the bead, or otherwise, without disturbing the element. In this condition, the wheel is mounted on the automobile and the automobile delivered to the dealer. Later, at the dealer's showroom, the automobile purchaser is given his choice of a large variety of valve stems and extension elements. These may include short valve stems, long valve stems which would extend through a wheel cover, stems having pressure indicating means, and stems of various colors and finishes so that the stem can be selected to match or contrast with the automobile or the wheel cover.

Each of the stems which may be selected is provided on its inner end with some means to engage the obstruction means which blocks the stem-receiving opening. The selected stem, equipped with a core or equivalent valve is then made to engage the obstruction means and force the obstruction means to unblock the opening. Then, without permitting the escape of a substantial amount of air, the stem is mounted in the opening and communicates with the inside of the filled tire and may thereafter be used to fill gauge and discharge air from the tire in the normal fashion.

It is, therefore, an object of the present invention to provide a process for preparing tires for use whereby the tire valve is installed after the tire is filled so that the manufacturer need not bear the expense of the valve and the purchaser may select to suit his personal taste the valve stems with which his car is originally outfitted.

Further objects of the invention will be apparent to those skilled in the art by reading the following specification including the drawings attached hereto, wherein:

FIGS. 1, 2 and 3 show a form of obstruction means embodying the invention and a valve stem hereunder being progressively brought into engagement therewith;

FIG. 2a is an enlarged sectional view taken on the line 2a—2a of FIG. 2;

FIGS. 4, 5 and 6 are sectional views of obstruction means embodying the invention and a valve stem hereunder being progressively brought into engagement therewith;

FIG. 5a is an enlarged sectional view taken on the line 5a—5a of FIG. 5;

FIG. 7 is a view showing a section of a rim of an automobile showing different sizes of available valve stems for use with the obstruction means thereof;

FIG. 8 is a fragmentary sectional view of a valve stem hereunder showing a modified form of passage through the stem;

FIG. 8a is a sectional view taken on the line 8a—8a of FIG. 8;

FIG. 8b is a sectional view taken on the line 8b—8b of FIG. 8;

Figure 9:
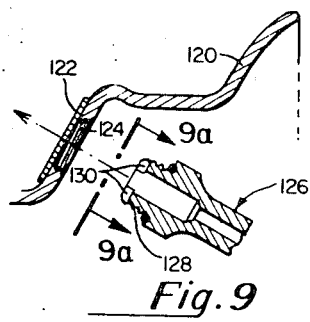
FIGS. 9 and 10 are sectional views of a rim having a modified form of obstruction means and showing in section, fragmentary, a valve stem under the invention being brought into engagement therewith.

Referring more specifically to the drawings, an obstruction means embodying the invention is generally designated 10 in FIG. 1. It comprises a rubber base 12 having outline generally comparable to the conventional snap-in tire valve as disclosed for instance in U.

S. Pat. No. 2,862,539 issued on Dec. 2, 1958 on an application filed by S. T. Williams.

As shown, the base features a circumferential groove 14 which engages the metal of the tire rim about the valve stem opening. The upper end of the rubber base (FIG. 1) is closed by a thin wall or diaphragm of rubber or the like as at 16 and the central opening of the rubber base up to the diaphragm 16 is provided with an insert 18 which may be brass or rigid plastic. Preferably as shown the insert 18 is provided with an outward flange 20 disposed circumferentially thereabout and a mouth extends upwardly as well as downwardly from the insert. The lower mouth is tapered in thickness as shown. A central portion of the insert is interiorly threaded as at 22. As shown, a cooperant groove 24 is provided in the central opening of the rubber base, to receive the flange 20 of the insert so that there will be no lateral movement of the insert with respect to the base.

It should be understood that the dimensions of the diaphragm or wall 16 and the configuration thereof are selected so as to promote the most effective piercing action of the insert as it is applied to the member.

FIG. 2 shows a rubber base or obstruction means 12 applied to the metal of an automobile rim in the stem opening. As shown, the peripheral groove 14 of the base 12 receives the metal of the rim 30 and the peripheral projections on either side of the groove are such that even at low temperatures there is a good seal and no looseness is exhibited between the base 12 and the metal of the rim.

In FIG. 2 the valve insert 34 has been brought into engagement with the rubber base 12. The insert comprises a body having a peripheral skirt 36 on its lower end and a central downward projection 38. Through the body of the insert 34 a central passage 40 is provided. At its upper end the passage 40 mounts a spring-pressed valve which is not the subject of this disclosure. The piercing projection 38 of the insert is formed with a centrally sharpened head 42 and the shape and dimensions of the passage 40 are such that two openings 44 appear respectively on the diagonal faces 46 of the lower end of the projection 38. Also note that the periphery of the projection 38 is exteriorly threaded and as shown these threads mate with the interior threads of the insert 18.

FIG. 3 shows the insert 34 brought down home on the rubber base. It should be noted that portions of the diaphragm or wall 16 are now inwardly turned and clamped snugly between the outer wall of the projection 38 and the insert. The insert also clampingly engages the upper end of the rubber base 12 compressing it against the upper end of the insert, and the outwardly flaring skirt 36 of the valve stem presses inwardly against the portion of the rubber base about the insert to complete the clamping action. By virtue of this arrangement, the engagement of the stem with the rubber base provides an effective seal with the insert so that no air is permitted to escape between the insert and the stem.

It should be understood that in the actual piercing of the diaphragm or wall 16 the sharpened end of the projection 38 must be pressed by hand or by an applying tool. Once the threaded portion of the projection 38 is in engagement with the interiorly threaded portion of the insert, however, simply twisting the valve stem 34 in the proper direction will screw it home so that additional pushing of the stem is not necessary.

A slightly modified version of the rubber base disclosed in FIGS. 1 through 3 is shown in FIGS. 4 through 6. In this version the rubber base 62 is provided with a peripheral groove 64 for engagement with the metal rim of the tire about the valve stem opening.

Here again, the general profile of the rubber base 62 is very comparable to that portion of the base of a valve stem of the "snap-in" stem type as disclosed in U. S. Pat. No. 2,862,539.

In the version of FIGS. 4 through 6, the diaphragm or wall 66 which comprises the obstruction means is inward from the ends of the base. There is thus provided an opening in the base, both above and below the wall 66. The upper opening 68 is formed with an outwardly directed peripheral groove 70 and upward perpendicular sides to complement the shape of a metal or rigid plastic insert 72 which is provided with an outward flange 74, which is received into the groove 70. The interior of the insert is threaded as at 76.

The lower opening 70 of the rubber base is formed in any suitable configuration which the mold may take provided that the shape of the resulting wall 66 is optimum for the piercing action.

FIG. 5 shows the engagement of the rubber base of FIG. 4 with the rim 80 about the peripheral groove 64. It also shows the rubber base 62 being engaged by the valve stem 82. The stem 82 may be of the same configuration as that of the stem 34 of FIGS. 2 and 3. The stem 82 shown in FIGS. 5 and 6 embodiment, however, is slightly different. The stem 82 comprises a body having a peripheral outwardly flaring skirt 84 at its lower end and a central downward projection 86. The projection 86 is exteriorly threaded as at 90 to engage the threads inside the insert 72. The valve stem 82 is formed with a central passage 92 which extends down into the projection 86. The pointed end of the projection 86 is solid, but spaced slightly up therefrom are perpendicularly extending openings 94 by which air may communicate into the tire from the passage 92.

FIG. 5a shows the openings 94 in the side of the projection 86.

FIG. 6 shows the valve stem screwed completely home on the insert 72. As shown, the projection 86 has pierced through the wall 66 and the openings 94 communicate with the inside of the tire. As shown, the peripheral skirt 84 engages compressively the rubber of the upper portion of the base 62 to assure a good seal.

FIG. 8 is a fragmentary sectional view showing modified passage means in the piercing projection 38 of FIG. 2, for instance. This version is labeled 38' and is distinguished in that the central passage 40' does not intercept the opposite faces 46' of the projection. Instead, channels 100 are formed along the projection and at a point well spaced above the tip of the projection intercept the passage 40'. As shown, the passage 40' stops well short of the point of the projection and as a result much solid material and hence strength is provided in the projection.

In operation, of course, air being introduced into the stem through the passage 40' passes down that passage and encounters the openings between the passage and the channels 100; thereafter the air passes through channels 100 into the body of the tire.

FIG. 7 is a sectional view showing a rim 110 of a tire having a rubber base 112 secured in the valve-stem opening 114. The base may be comparable, for instance, to the version shown at 12 in FIGS. 1 through 3. In FIG. 7 for comparison three different valve stems 116 *a, b,* & *c* are shown indicating the adaptation of the system to different length valve inserts. The stems 116*a, b,* & *c* are successively longer so that the fill openings will reach to an optimum point of access.

Figure 9A:
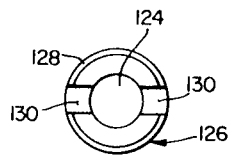
FIG. 9a is an enlarged sectional view taken on the line 9a—9a of FIG. 9.
Figure 10:
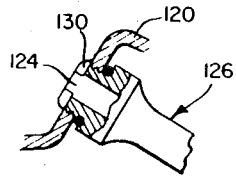

In the version embodying the invention shown in FIGS. 9 through 10, including FIG. 9*a,* the obstruction means is mounted on the rim 120 and is a thin metal disc 122. As shown, the disc may be adhesived or soldered to the rim. The valve stem opening 124 is interiorly threaded. The stem itself 126 is formed with exterior threads as at 128 and the end of the extension is formed with a slot 130. The slot (see FIG. 9*a*) forms abrupt edges and corners with the end surface 132 to engage more easily and pierce the disc 122. FIG. 10 shows the valve stem screwed all the way into the opening 124. The central passage 124 extends out into the inside of the tire.

Figure 11:
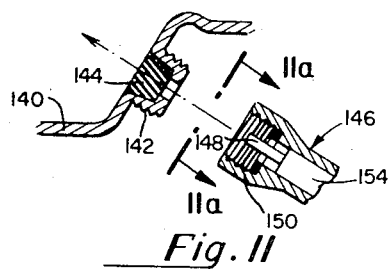
FIGS. 11 and 12 are fragmentary sectional views of a rim having a modified form of obstruction means and a valve stem being brought progressively into engagement therewith.
Figure 11A:
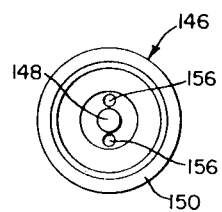
FIG. 11a is a sectional view taken on the line 11a—11a of FIG. 11.
Figure 12:
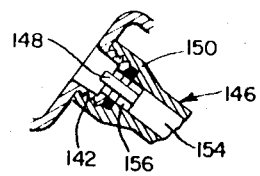

In the embodiment of the invention shown in FIGS. 11 through 12, including FIG. 11*a,* the rim 140 is provided with a stem-receiving hollow boss 142 which is exteriorly threaded. The boss is formed with a central opening which is enlarged as shown to receive a plug 144. This plug, which may be of rubber or the like, is held in place partly by the pressure of the air within the tire.

The valve stem 146 is provided with a central upwardly extending projection 148 and a peripheral wall 150 which extends thereabout and is interiorly threaded to mate with the threads on the boss 142. The wall 150 is provided with a gasket for sealing engagement with the end of the boss. In operation, as shown in FIG. 12, the valve stem is screwed onto the boss and the projection 148 forces the plug 144 inwardly to remove it from the opening 152 so that there is easy access between the passage 154 in the valve stem in the inside of the tire. Note openings 156.

Figure 13:
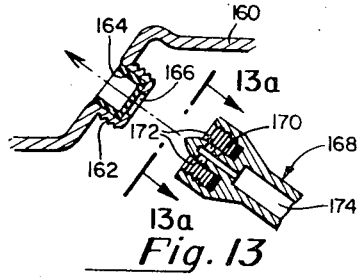
FIGS. 13 and 14 are sectional fragmentary views of a rim having a modified form of obstruction means and showing a fragmentary sectional view of a valve stem hereunder being progressively brought into engagement therewith.
Figure 13A:
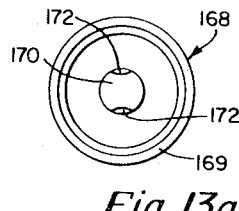
FIG. 13a is a sectional view taken on the line 13a—13a of FIG. 13.
Figure 14:
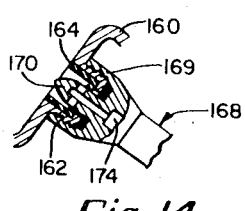

The modification in FIGS. 13 through 14, including FIG. 13*a,* is similar to those of the next earlier embodiment in that the rim 160 is provided with a threaded boss 162. In the FIG. 13 version the plug takes the form of a cup 164 which serves as an obstruction means for the opening 166. The valve stem 168 is provided with an interiorly threaded peripheral wall 169 and a central piercing pin 170 with lateral openings 172 which communicate with the central passage 174 of the valve stem. In installation, the valve stem 168 is screwed onto the boss 162. At the same time, the piercing pin 170 pierces the cup 164 and when the stem is screwed home on the boss, the lateral passages 172 extend out into the tire so that the passage 174 now communicates with the tire.

Figure 15:
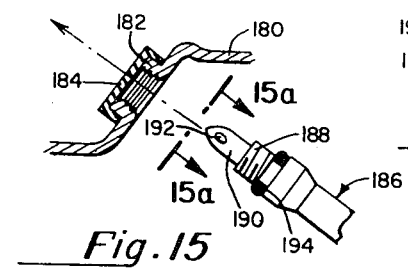
FIGS. 15 and 16 are fragmentary sectional views of a still further modified form of obstruction means and a valve stem hereunder being progressively brought into engagement therewith.
Figure 15A:
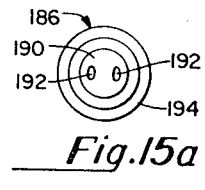
FIG. 15a is a sectional view taken on the line 15a—15a of FIG. 15.
Figure 16:
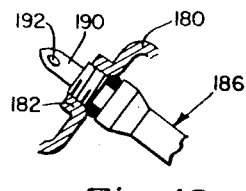

In the modification shown in FIGS. 15 through 16, including FIG. 15*a,* the rim 180 is provided with an inward boss 182 which is hollow and interiorly threaded. The obstruction means takes the form of a cap 184 which fits over the inward boss 182 and is held partly in place by the air pressure within the tire.

The valve stem 186 is provided with a threaded portion 188 and a piercing pin 190 at its distal end. The pin as in the FIG. 13 version has lateral openings 192 which communicate with a central passage in the stem. As shown in FIG. 16, when the valve stem is screwed home so that its shoulder 194 butts up against the rim, the piercing pin 190 has pierced the cap 196 so that the lateral openings 192 communicate with the inside of the tire.

Figure 17:
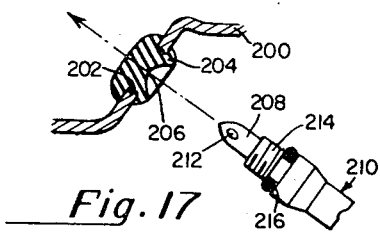
FIGS. 17 and 18 are fragmentary sectional views of a rim and plan views of a valve stem being brought into engagement therewith.
Figure 18:
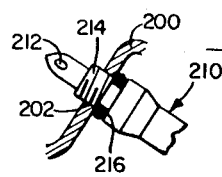

In the modification shown in FIGS. 17 and 18, the valve stem takes the same form as in the FIGS. 15–16 version. The rim 200, however, is formed with no boss at all, its opening 202 being simply threaded and receiving a plug 204 similar to a grommet. On the outside of the rim the plug 204 is formed with a conical indentation 206 which is engaged by the dislodging projection 208 on the end of the valve stem 210. The dislodging end 208 is provided as before with the lateral openings 212 and there is an intermediate threaded portion 214 equipped with an "O" ring and a shoulder 216. When this valve stem is screwed home, as shown in FIG. 18, the plug 204 is pushed inward, the "O" ring engages the outer surface of the rim and the lateral openings 212 are opened to the inside of the tire so that the central passage in the valve stem communicates with the tire.

In the versions disclosed, it should be understood that the valve itself of the valve stem provided may take any of various configurations. For instance, as shown in part in the FIG. 5 version, the valve may be the conventional core valve of the replaceable type, or it may be a spring pressed valve of the non-replaceable type as shown for instance in part in FIG. 2.

While this invention has been shown in but a limited number of forms, it should be understood that the invention is capable of a limitless number of modifications and adaptations. The invention covered therefore should be thought of as having the scope of the appended claims.

I claim:

1. A rim for a pneumatic tubeless tire, the rim having a valve-stem-receiving opening therein, the opening being surrounded by an outward boss, the boss being exteriorly threaded, the inside of the boss having an enlarged portion spaced inward from the opening, and temporary obstruction means comprising a plug fitting snugly into the enlarged portion.

* * * * *